United States Patent
Yamada et al.

(10) Patent No.: US 10,884,244 B2
(45) Date of Patent: Jan. 5, 2021

(54) DISPLAY APPARATUS

(71) Applicant: Seiko Epson Corporation, Tokyo (JP)

(72) Inventors: Fumika Yamada, Matsumoto (JP);
Masatoshi Yonekubo, Hara-mura (JP);
Osamu Yokoyama, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 62 days.

(21) Appl. No.: 16/154,775

(22) Filed: Oct. 9, 2018

(65) Prior Publication Data

US 2019/0041650 A1 Feb. 7, 2019

Related U.S. Application Data

(63) Continuation of application No. 14/120,347, filed on May 14, 2014, now abandoned.

(30) Foreign Application Priority Data

May 14, 2013 (JP) .................................. 2013-101932

(51) Int. Cl.
*G02B 27/01* (2006.01)
*G02B 5/30* (2006.01)

(52) U.S. Cl.
CPC ........... *G02B 27/0172* (2013.01); *G02B 5/30* (2013.01); *G02B 27/0101* (2013.01);
(Continued)

(58) Field of Classification Search
CPC ............... G02B 27/0172; G02B 27/01; G02B 27/0101; G02B 27/0149; G02B 27/017;
(Continued)

(56) References Cited

U.S. PATENT DOCUMENTS 6,829,095 B2 12/2004 Amitai
7,475,991 B2 1/2009 Ma
(Continued)

FOREIGN PATENT DOCUMENTS

CN 1868033 11/2006
JP 2003-536102 A 2/2003
(Continued)

OTHER PUBLICATIONS

Non-Final Office Action received in U.S. Appl. No. 14/120,347, dated Oct. 22, 2015.
(Continued)

*Primary Examiner* — Kristina M Deherrera
(74) *Attorney, Agent, or Firm* — JCIPRNET

(57) ABSTRACT

A display apparatus includes an image forming device, first and second light guide members that respectively have first and second light incidence portions and first and second light emission portions, a first diffractive optical element provided in the first light emission portion, a second diffractive optical element provided in the second light emission portion, and a first external light noise reduction element provided over the second light guide member. The first external light noise reduction element overlaps the first and second light emission portions. The first light incidence portion overlaps the second light incidence portion. Image light from the image forming device is incident on the first light incidence portion. A part of the image light is guided in the first light guide member. Another part of the image light is incident on the second light incidence portion and is guided in the second light guide member.

7 Claims, 5 Drawing Sheets

(52) U.S. Cl.
CPC .... *G02B 27/017* (2013.01); *G02B 2027/0118* (2013.01); *G02B 2027/0178* (2013.01)

(58) Field of Classification Search
CPC . G02B 27/0176; G02B 27/0179; G09G 5/377
USPC .................................... 359/492.01, 483.01
See application file for complete search history.

(56) References Cited

U.S. PATENT DOCUMENTS

| | | | |
|---|---|---|---|
| 2004/0085292 | A1 | 5/2004 | Spitzer et al. |
| 2006/0132914 | A1 | 6/2006 | Weiss |
| 2007/0070859 | A1 | 3/2007 | Hirayama |
| 2007/0188837 | A1 | 8/2007 | Shimizu et al. |
| 2008/0043334 | A1 | 2/2008 | Itzkovitch |
| 2008/0278812 | A1 | 11/2008 | Amitai |
| 2010/0066926 | A1 | 3/2010 | Tanijiri |
| 2011/0267679 | A1 | 11/2011 | Ito |
| 2012/0200831 | A1* | 8/2012 | Tominaga ......... G02F 1/133536 353/20 |
| 2012/0306940 | A1 | 12/2012 | Machida |
| 2013/0242392 | A1* | 9/2013 | Amirparviz ........ G02B 27/0172 359/485.05 |
| 2014/0064655 | A1* | 3/2014 | Nguyen ............. G02B 27/0081 385/11 |
| 2014/0168260 | A1* | 6/2014 | O'Brien ................ G09G 5/377 345/633 |
| 2015/0177591 | A1 | 6/2015 | Sugiyama et al. |

FOREIGN PATENT DOCUMENTS

| | | |
|---|---|---|
| JP | 2006-003872 A | 1/2006 |
| JP | 2007-219106 A | 8/2007 |
| JP | 2009-515225 A | 4/2009 |
| JP | 2012-163662 A | 8/2012 |
| WO | WO-2001-095027 A | 12/2001 |
| WO | WO-2014-156167 A | 10/2014 |

OTHER PUBLICATIONS

Final Office Action received in U.S. Appl. No. 14/120,347, dated Apr. 22, 2016.
Non-Final Office Action received in U.S. Appl. No. 14/120,347, dated Oct. 3, 2016.
Final Office Action received in U.S. Appl. No. 14/120,347, dated Apr. 5, 2017.
Final Office Action received in U.S. Appl. No. 14/120,347, dated Jul. 14, 2017.
Advisory Action received in U.S. Appl. No. 14/120,347, dated Nov. 27, 2017.
Non-Final Office Action received in U.S. Appl. No. 14/120,347, dated Jan. 29, 2018.
Final Office Action received in U.S. Appl. No. 14/120,347, dated Jun. 29, 2018.

* cited by examiner

DISPLAY APPARATUS

The present application is a continuation application of U.S. patent application Ser. No. 14/120,347, filed May 14, 2014, which claims priority from Japanese Patent Application No. 2013-101932, filed May 14, 2013, which are expressly incorporated by reference herein.

BACKGROUND

1. Technical Field

The present invention relates to a display apparatus in which image light is guided in a light guide member and emitted.

2. Related Art

Examples of a display apparatus in which image light is guided in a light guide member and emitted can include a head-mounted display apparatus. The head-mounted display apparatus includes an image forming device and a translucent light guide member which has an image light incidence portion on which the image light emitted from the image forming device is incident and an image light emission portion that emits the incident image light from the image light incidence portion. For this reason, with the image light emitted from the image light emission portion, it is possible to see an image formed by the image forming device and to see a state of a side opposite to the light guide member.

In regards to the head-mounted display apparatus, there has been suggested a configuration that has, as an optical element which change the movement direction of the image light, a first diffractive optical element on an incident side that diffracts the image light emitted from the image forming device and makes the diffracted image light incident on the image light incidence portion, and a second diffractive optical element on an emitting side that diffracts the image light emitted from the image light emission portion toward the eyes of an observer (refer to JP-A-2007-219106).

However, as shown in the configuration described in JP-A-2007-219106, in the configuration in which the image light is diffracted toward the eyes of the observer by the diffractive optical element, even a part of unnecessary external light which is incident on the light guide member is also diffracted toward the eyes of the observer by the diffractive optical element, and thus there is a problem in that external light noise is generated. If the above-described external light noise is generated, the external light noise appears overlapped with the image. Therefore, the configuration is not preferable.

SUMMARY

An advantage of some aspects of the invention is to provide a display apparatus that can prevent external light noise which appears overlapped with an image from being generated.

According to an aspect of the invention, there is provided a display apparatus including: an image forming device which emits image light; a light guide member which has an image light incidence portion, an external light incidence portion, and a light emission portion; a first diffractive optical element provided in the light emission portion; and a polarizing member provided in the external light incidence portion.

According to the aspect of the invention, the image light emitted from the image forming device moves forward in the light guide member and is emitted from the image light emission portion, after being incident on the image light incidence portion of the light guide member. The image light emitted from the image light emission portion is diffracted by the first diffractive optical element and reaches the eyes of an observer. In addition, since the polarizing member is provided in the external light incidence portion of the light guide member, even when unnecessary external light is forced to be incident on the light guide member, it is possible to inhibit the unnecessary external light from reaching the eyes of the observer. For this reason, it is possible to inhibit the external light noise from appearing overlapped with an image.

According to the aspect of the invention, the polarizing member may block first polarized light having high diffraction efficiency in polarization characteristics of the first diffractive optical element, and transmit second polarized light having low diffraction efficiency. In the above-described configuration, even when the unnecessary external light is forced to be incident on the light guide member, it is possible to efficiently inhibit the unnecessary external light from reaching the eyes of the observer. For this reason, it is possible to inhibit the external light noise from appearing overlapped with the image.

According to the aspect of the invention, the light emission portion may be positioned on a first surface of the light guide member, and the polarizing member may be provided on a second surface opposite to the first surface.

According to the aspect of the invention, the polarizing member may have a part overlapped with the first diffractive optical element when viewed from a direction perpendicular to the first surface. In the above-described configuration, it is possible to efficiently inhibit the unnecessary external light from reaching the eyes of the observer.

According to the aspect of the invention, the polarizing member may be larger than the first diffractive optical element when viewed from the direction perpendicular to the first surface. In the above-described configuration, it is possible to efficiently inhibit the unnecessary external light from reaching the eyes of the observer.

According to the aspect of the invention, the image light may be emitted in a first direction after being incident from the image light incidence portion, guided in the light guide member, and diffracted by the first diffractive optical element, and the polarizing member may be larger than the first diffractive optical element when viewed from the first direction. In the above-described configuration, it is possible to efficiently inhibit the unnecessary external light from reaching the eyes of the observer.

According to another aspect of the invention, there is provided a display apparatus including: an image forming device which emits image light; a light guide member which has an image light incidence portion, an external light incidence portion, and a light emission portion; a first diffractive optical element provided in the light emission portion; and a multilayer film mirror which is provided in the external light incidence portion and in which transmissivity has incident angle dependence.

According to the aspect of the invention, the image light emitted from the image forming device moves forward in the light guide member and is emitted from the image light emission portion, after being incident on the image light incidence portion of the light guide member. The image light emitted from the image light emission portion is diffracted by the first diffractive optical element and reaches the eyes of an observer. In addition, since the multilayer film mirror is provided in the external light incidence portion of the light guide member, even when the unnecessary external light is forced to be incident on the light guide member, it is possible to inhibit the unnecessary external light from reaching the eyes of the observer. For this reason, it is possible to inhibit the external light noise from appearing overlapped with an image.

According to the aspect of the invention, the multilayer film mirror may have a first incident angle range and a second incident angle range in which the transmissivity is higher than the transmissivity in the first incident angle range, and the first-order diffraction angle of the image light by the first diffractive optical element may be included in the second incident angle range.

According to the aspect of the invention, the light emission portion may be positioned on the first surface of the light guide member, and the multilayer film mirror may be provided on the second surface opposite to the first surface.

According to the aspect of the invention, the multilayer film mirror may have a part overlapped with the first diffractive optical element when viewed from the direction perpendicular to the first surface. In the above-described configuration, it is possible to efficiently inhibit the unnecessary external light from reaching the eyes of the observer.

According to the aspect of the invention, the multilayer film mirror may be larger than the first diffractive optical element when viewed from the direction perpendicular to the first surface. In the above-described configuration, it is possible to efficiently inhibit the unnecessary external light from reaching the eyes of the observer.

According to the aspect of the invention, the image light may be emitted in the first direction after being incident from the image light incidence portion, guided in the light guide member, and diffracted by the first diffractive optical element, and the multilayer film mirror may be larger than the first diffractive optical element when viewed from the first direction. In the above-described configuration, it is possible to efficiently inhibit the unnecessary external light from reaching the eyes of the observer.

According to the aspects of the invention, the second diffractive optical element may be provided between the image forming device and the light incidence portion.

According to the aspects of the invention, a frame that retains the light guide member may be provided and the frame may be worn on the head.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
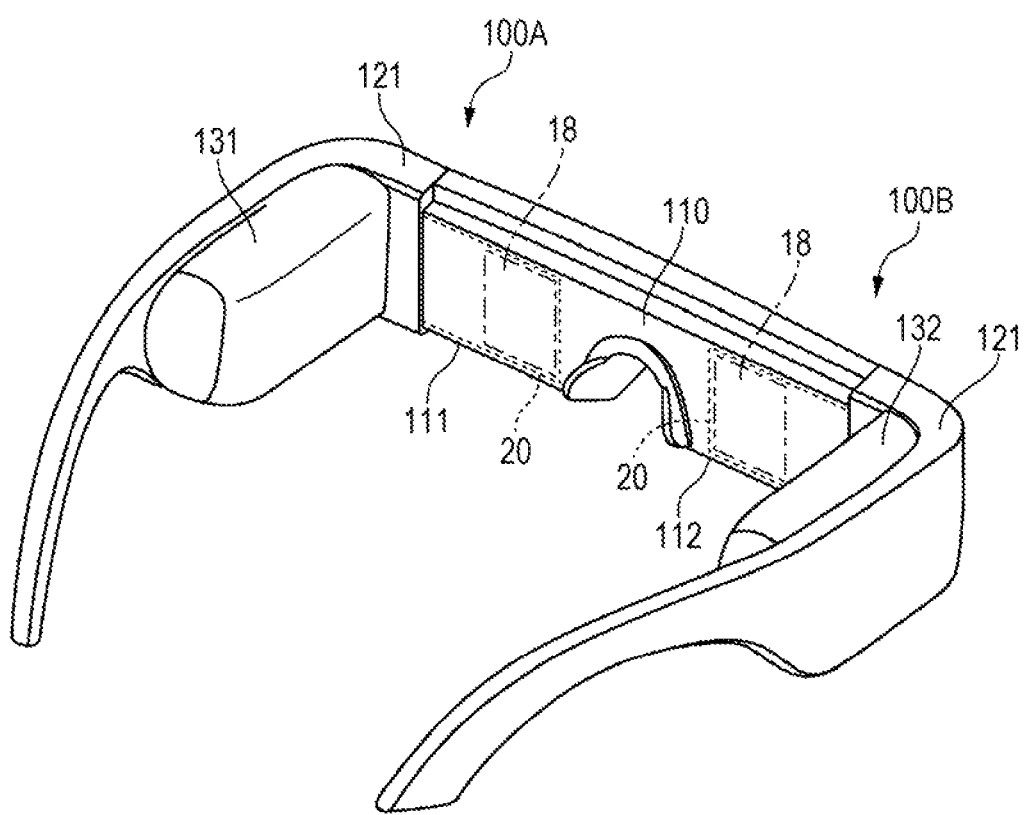
FIG. 1 is a perspective view illustrating an example of a display apparatus according to Embodiment 1 of the invention.

Hereinafter, an embodiment of the invention will be described. In the drawings referred to in the following description, the scale of each layer and each member is made to be different so that each layer and each member has a size that is recognizable in the drawings. In addition, since the external field can be viewed by a display apparatus to be described hereinafter in a see-through state, in order to distinguish the external light in this case from unnecessary external light, the external light when the external field is viewed in a see-through state will be described as "external field light", and the unnecessary external light will be described simply as "external light."

Embodiment 1

Entire Configuration of Display Apparatus

Figure 2A:
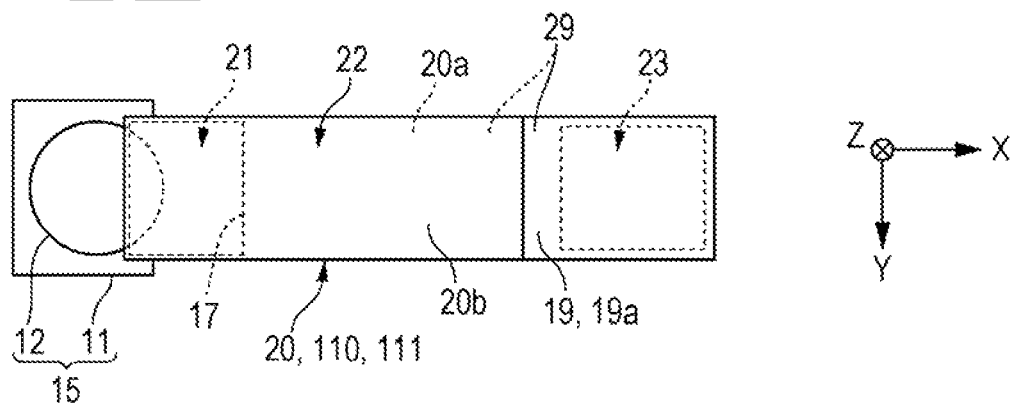
FIGS. 2A to 2C are views illustrating an optical system and the like of the display apparatus shown in FIG. 1.
Figure 2B:
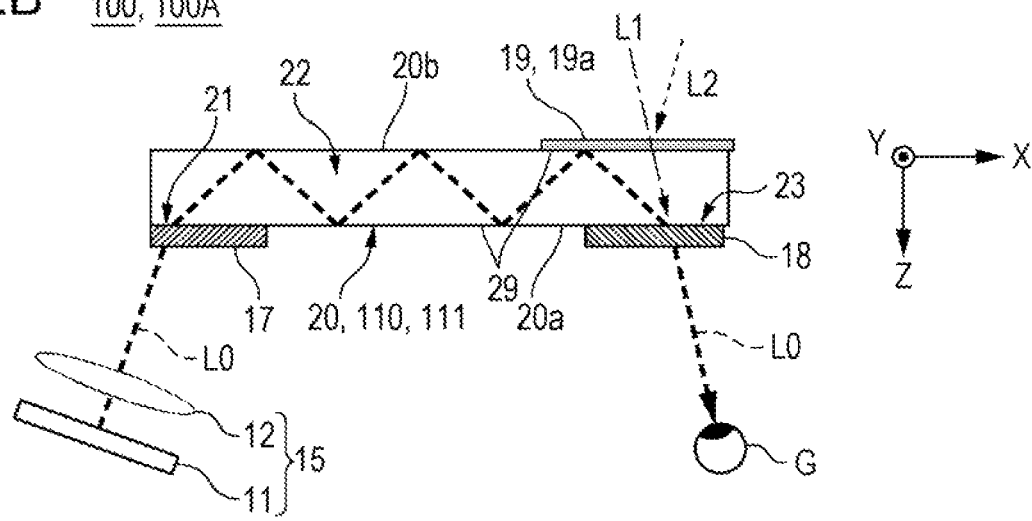
Figure 2C:
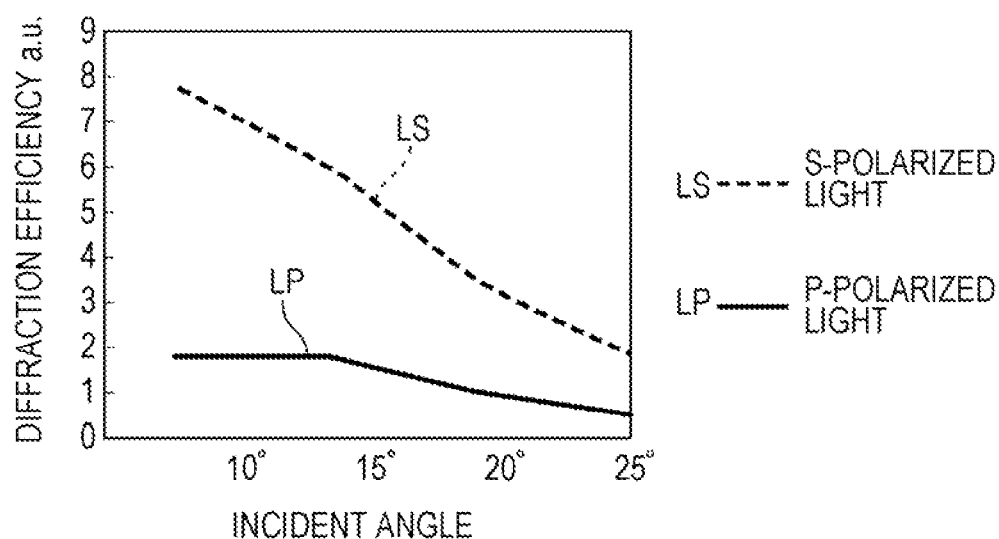

FIG. 1 is a perspective view illustrating an example of the display apparatus according to Embodiment 1 of the invention. FIGS. 2A to 2C are views illustrating an optical system and the like of the display apparatus shown in FIG. 1. FIG. 2A is a front view, FIG. 2B is a plan view, and FIG. 2C is a graph illustrating diffraction efficiency of a second diffractive optical element.

A display apparatus 100 in FIG. 1 is a head-mounted display (head-mounted display apparatus) having an appearance of glasses. The display apparatus can allow an observer wearing the display apparatus 100 to recognize image light and to observe an external field image in a see-through state. The display apparatus 100 includes an optical panel 110 which covers the front of the eyes of the observer, a frame 121 which supports the optical panel 110, and a drive portion (a first drive portion 131 and a second drive portion 132) which is disposed in the vicinity of a corner of the frame 121. The optical panel 110 has a first panel portion 111 and a second panel portion 112. The first panel portion 111 and the second panel portion 112 are board-shaped components connected to each other integrally at the center. A first display apparatus 100A combined by the first panel portion 111 and the first drive portion 131 on a left side toward the drawing is a part for the left eye and functions as a display apparatus independently. In addition, a second display apparatus 100B combined by the second panel portion 112 and the second drive portion 132 on a right side toward the drawing is a part for the right eye and functions as a virtual image display apparatus independently.

As shown in FIG. 2, the first display apparatus 100A includes an image light emission device 15, a light guide member 20, and the like. The image light emission device 15 corresponds to the first drive portion 131 in FIG. 1, and the light guide member 20 corresponds to the first panel portion 111 in FIG. 1. In addition, the second display apparatus 100B shown in FIG. 1 has the same structure as that of the first display apparatus 100A, and only right and left sides of the structure are reversed. Therefore, detail description of the second display apparatus 100B will be omitted.

The image light emission device 15 has an image forming device 11 and a projection optical system 12. The image forming device 11 is not shown in the drawings. However, the image forming device 11 has: a lighting device that emits two dimensional illumination light; a liquid crystal display device which is a transmissive spatial light modulation device; and a drive control portion that controls an operation of the lighting device and the liquid crystal display device. The lighting device generates light including 3 colors, such as red, green, and blue. The liquid crystal display device spatially modulates the illumination light from the lighting device and forms image light L0 to be a display object of a video image or the like. The projection optical system 12 is a collimating lens that converts the image light emitted from each point on the liquid crystal display apparatus into a luminous flux in a parallel state. In addition, a reflection type spatial light modulator that reflects a light from a light source by a mirror, such as MEMS, and forms an image may be used as the image forming device 11.

The light guide member 20 is composed of a board-shaped translucent member which has a surface (a first surface 20a and a second surface 20b) parallel to an XY surface and extends in an X direction. The light guide member 20 is an integrated component, but functionally, can be considered as a component separated into an image light incidence portion 21, a light guide portion 22, and an image light emission portion 23.

The image light incidence portion 21 is a surface that faces the image light emission device 15 in one side end portion of the X direction of the light guide member 20. The image light emission portion 23 is a surface that faces an eye G of the observer in the other side end portion of the X direction of the light guide member 20. The light guide portion 22 is a part positioned between the image light incidence portion 21 and the image light emission portion 23. In the embodiment, an emission direction of the image light L0 from the image light emission device 15 obliquely faces the image light incidence portion 21. A view of the observer obliquely faces the image light emission portion 23.

There are some cases where the image light incidence portion 21 and the image light emission portion 23 are configured on a different surface in a Y direction of the light guide member 20. However, in the embodiment, the image light incidence portion 21 and the image light emission portion 23 are configured on the surface (the first surface 20a) of one side of the Y direction in the light guide member 20.

By using the first surface 20a of one side and the second surface 20b of the other side of a Z direction of the light guide member 20 as reflection surfaces, the light guide portion 22 guides the image light L0 which is incident from the image light incidence portion 21 to the image light emission portion 23. Here, the first surface 20a and the second surface 20b are entire reflection surfaces that use a refractive index difference, and a reflection coating of a mirror layer or the like is not applied. In addition, a thickness of the Z direction of the light guide member 20 is, for example, approximately 5 mm.

Second Diffractive Optical Element 17 and First Diffractive Optical Element 18

In the light guide member 20, a first diffractive optical element 18 is disposed so as to be overlapped with the image light emission portion 23, and a second diffractive optical element 17 is disposed so as to be overlapped with the image light incidence portion 21. The second diffractive optical element 17 diffracts the image light L0 emitted from the image light emission device 15 and makes the image light L0 obliquely incident on the image light incidence portion 21. The first diffractive optical element 18 diffracts the image light L0 emitted from the image light emission device 15 and makes the image light L0 reach the eye G of the observer.

In the embodiment, the first diffractive optical element 18 is a diffractive optical element of a surface relief type, and has diffraction efficiency shown in FIG. 2C with respect to the light which is incident on the first diffractive optical element 18. In FIG. 2C, the diffraction efficiency of S-polarized light in which a groove direction of the first diffractive optical element 18 and a vibration direction of an electric field vector are perpendicular to each other, is shown as a dotted line LS. In FIG. 2C, the diffraction efficiency of P-polarized light in which a groove direction of the first diffractive optical element 18, a vibration direction of an electric field vector, and the like are in parallel, is shown as a solid line LP.

As shown in FIG. 2C, in the embodiment, the S-polarized light (first polarized light) has high diffraction efficiency compared to the P-polarized light (second polarized light). For this reason, in the embodiment, the image light L0 emitted from the image light emission device 15 is emitted in a state where the S-polarized light is largely included according to the characteristics shown in FIG. 2C, and reaches the eye G of the observer as a light largely including the S-polarized light.

Image Display Operation

In the display apparatus 100 of the embodiment, if the image light L0 is emitted from the image light emission device 15, a first-order diffracted light (for example, a positive first-order diffracted light) diffracted in the X direction by the first diffractive optical element 18 is incident on the light guide member 20 from the image light incidence portion 21. In the light guide member 20, first of all, the image light L0 is incident on the second surface 20b of the light guide member 20 and entirely reflected.

Next, the image light L0 is incident on the first surface 20a of the light guide member 20 and entirely reflected. As the operation is repeated in the following, the image light is guided in an inner portion of the light guide member 20 to a side where the image light emission portion 23 is disposed.

After the image light L0 is emitted from the image light emission portion 23, the image light L0 is diffracted in the X direction by the first diffractive optical element 18, and the first-order diffracted light (for example, the positive first-order diffracted light) reaches the eye G of the observer. Therefore, the observer can see the image formed by the image light emission device 15.

Recognizing a Background in a See-Through State

Figure 3:
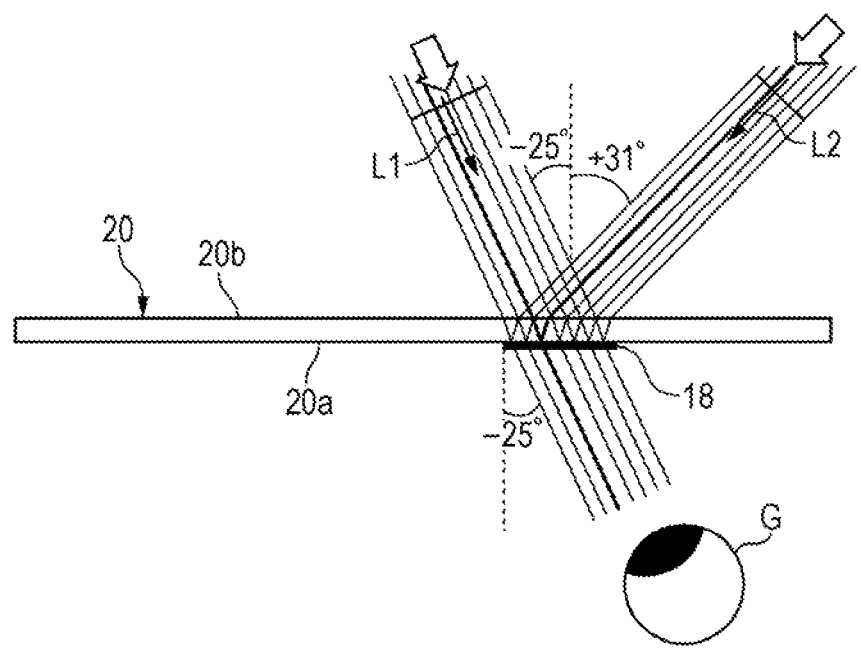
FIG. 3 is a view illustrating a state where a background is recognized in a see-through state in the display apparatus according to Embodiment 1 of the invention.

FIG. 3 is a view illustrating a state where a background is recognized in a see-through state in the display apparatus 100 according to Embodiment 1 of the invention. In addition, when an incident angle is expressed, FIG. 3 expresses a polarity of a direction inclined clockwise from a normal line with respect to an incident portion as "+", and a polarity of a direction counterclockwise from the normal line with respect to the incident portion as "−".

In the display apparatus 100 of the invention, the reflection coating is not applied on the first surface 20a and the second surface 20b of the light guide member 20. For this reason, in the light guide member 20, the entire surface except the image light incidence portion 21 and the image light emission portion 23 is an external light incidence portion 29 in which the external light can be incident. Therefore, in a side opposite to the light guide member 20, an external field light L1 that moves forward on a virtual line (on a virtual line that extends in a direction along a diffraction direction of the image light L0 by the first diffractive optical element 18 passing through the image light emission portion 23) which passes through the eye G of the observer and the image light emission portion 23, is emitted from the image light emission portion 23 after being incident on the light guide member 20 from the second surface 20b on the external light incidence portion 29. Among the external field light beams L1, a light emitted as zero-order light from the first diffractive optical element 18 reaches the eye G of the observer. Therefore, the observer can see the image formed by the image light emission device 15, the background on the side opposite to the light guide member 20, and the like, in a see-through state. In the embodiment, since the diffraction efficiency of the first diffractive optical element 18 of the P-polarized light is lower than the diffraction efficiency of the S-polarized light, among the external field light beams L1, the P-polarized light transmitted as the zero-order light from the first diffractive optical element 18 mainly reaches the eye G of the observer.

In addition, in the invention, the eye G of the observer is set to be disposed in a position, for example, where the angle is −25° to the normal line with respect to the first surface 20a of the light guide member 20, the image light emission portion 23, and the first diffractive optical element 18. For this reason, the external field light L1 reaches the eye G of the observer at an incident angle of −25° with respect to the second surface 20b of the light guide member 20 from the side opposite to the light guide member 20.

Countermeasures on Unnecessary External Light

In the display apparatus 100 of the invention, for example, on the side opposite to the light guide member 20, the unnecessary external light (an external light L2 shown in FIG. 3) which is incident on the second surface 20b on the external light incidence portion 29 of the light guide member 20, for example, at the incident angle of +31°, is prevented from reaching the eye G of the observer by using an external light noise reduction element 19 that will be described hereinafter. More specifically, on the external light incidence portion 29 of the light guide member 20, the external light noise reduction element 19 is provided in the position where the unnecessary external light L2 is incident.

The external light noise reduction element 19 is disposed along the second surface 20b of a side (opposite side to the surface side facing the image light emission portion 23 of the light guide member 20) opposite to the side where the first diffractive optical element 18 is disposed among the first surface 20a and the second surface 20b of the light guide member 20. Here, when the external light noise reduction element 19 is viewed from the normal line direction (a direction perpendicular to the image light emission portion 23) with respect to the image light emission portion 23, the external light noise reduction element 19 is overlapped with the first diffractive optical element 18. In addition, when the external light noise reduction element 19 is viewed from the normal line direction with respect to the image light emission portion 23, the external light noise reduction element 19 is disposed across a region which is greater than that of the first diffractive optical element 18.

In the embodiment, the external light noise reduction element 19 is a polarizing member 19a, transmits the second polarized light having low diffraction efficiency in the first diffractive optical element 18, and blocks the first polarized light having high diffraction efficiency in the first diffractive optical element 18. In the embodiment, the external light noise reduction element 19 (the polarizing member 19a) transmits the P-polarized light (the second polarized light) having low diffraction efficiency in the first diffractive optical element 18, and blocks the S-polarized light (the first polarized light) having high diffraction efficiency in the first diffractive optical element 18.

Therefore, in the display apparatus 100 of the embodiment, the observer can see the image formed by the image light emission device 15, the background on the side opposite to the light guide member 20, and the like, in a see-through state. Meanwhile, on the side opposite to the light guide member 20, it is possible to inhibit the unnecessary external light L2 which is incident, for example, at the incident angle of +31°, on the second surface 20b of the light guide member 20 from reaching the eye G of the observer as the first-order diffracted light which is diffracted by the first diffractive optical element 18.

In the embodiment, when the external light noise reduction element 19 is viewed from the normal line direction with respect to the image light emission portion 23, the external light noise reduction element 19 is disposed across the region which is greater than that of the first diffractive optical element 18. In addition, when the external light noise reduction element 19 is viewed from the direction along the virtual line (a positive first-order diffraction direction of the image light L0 by the first diffractive optical element 18 is the first direction) which passes through the eye G of the observer and the image light emission portion 23, the external light noise reduction element 19 is larger than the first diffractive optical element 18 and disposed across the region which is greater than that of the first diffractive optical element 18. Therefore, the virtual line (the positive first-order diffraction direction of the image light L0 by the first diffractive optical element 18 is the virtual line that extends along the first direction) which passes through the eye G of the observer and the image light emission portion 23, passes through the external light noise reduction element 19. In this case, the external light noise reduction element 19 (the polarizing member 19a) transmits the P-polarized light, and thus the observer can see the image formed by the image light emission device 15 and the external field light L1.

Main Effect of the Embodiment

As described above, in the display apparatus 100 of the embodiment, the image light L0 emitted from the image forming device 11 is incident on the image light incidence portion 21 of the light guide member 20 after being diffracted by the second diffractive optical element 17, and emitted from the image light emission portion 23 after moving forward in the light guide member 20. The image light L0 emitted from the image light emission portion 23 is diffracted by the first diffractive optical element 18 and reaches the eye G of the observer.

In addition, in the embodiment, since the external light noise reduction element 19 is provided on a position where the unnecessary external light L2 is incident on the light guide member 20, it is possible to inhibit the unnecessary external light L2 from reaching the eye G of the observer even when the unnecessary external light L2 is forced to be incident on the light guide member 20. For this reason, it is possible to inhibit the external light noise from appearing overlapped with the image.

In addition, the external light noise reduction element 19 is disposed so as to be overlapped with the second surface 20b of a side (opposite side to the surface side facing the image light emission portion 23 of the light guide member 20) opposite to the side where the first diffractive optical element 18 is disposed among the first surface 20a and the second surface 20b of the light guide member 20. Here, when the external light noise reduction element 19 is viewed from the normal line direction with respect to the image light emission portion 23, the external light noise reduction element 19 is overlapped with the first diffractive optical element 18, and the external light noise reduction element 19 is disposed across a region which is greater than that of the first diffractive optical element 18. In addition, the virtual line, which passes through the image light emission portion 23 and extends along the diffraction direction of the image light L0 by the first diffractive optical element 18, passes through the region where the external light noise reduction element 19 is disposed. For this reason, among the unnecessary external light beams L2, it is possible to efficiently reduce components that are forced to be incident on a position where the components are likely to reach the eye of the observer in the light guide member 20.

In addition, the external light noise reduction element 19 is the polarizing member 19a. The polarizing member 19a blocks the S-polarized light (the first polarized light) having high diffraction efficiency in the polarization characteristics of the first diffractive optical element 18 and transmits the P-polarized light (the second polarized light) having low diffraction efficiency. For this reason, among the unnecessary external light beams L2, it is possible to efficiently reduce components which are likely to reach the eye of the observer as the first-order diffracted light diffracted by the first diffractive optical element 18.

Embodiment 2

Figure 4A:
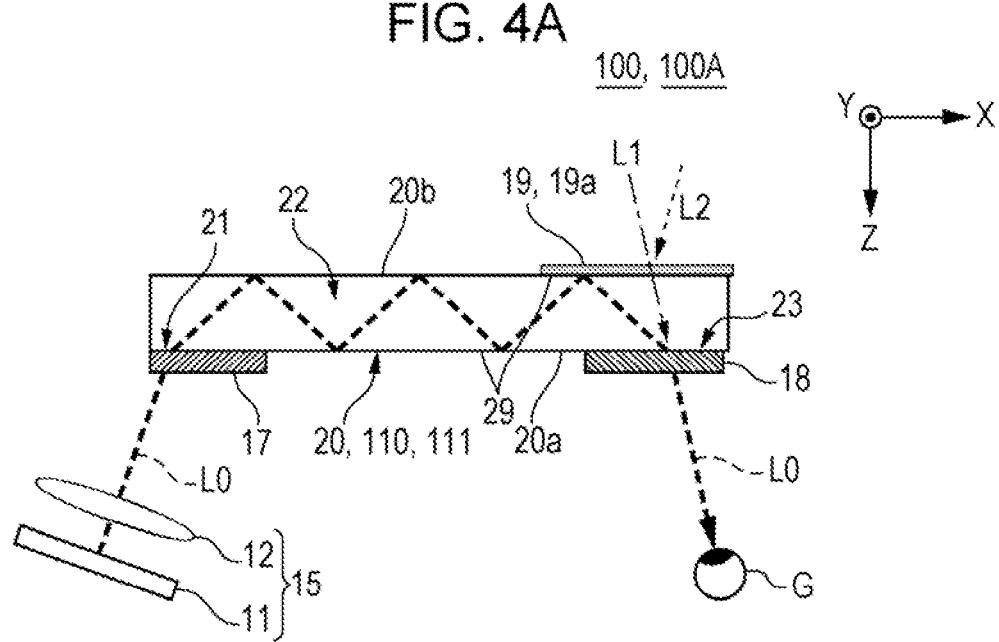
FIGS. 4A to 4B are views illustrating the optical system and the like of the display apparatus according to Embodiment 2 of the invention.
Figure 4B:
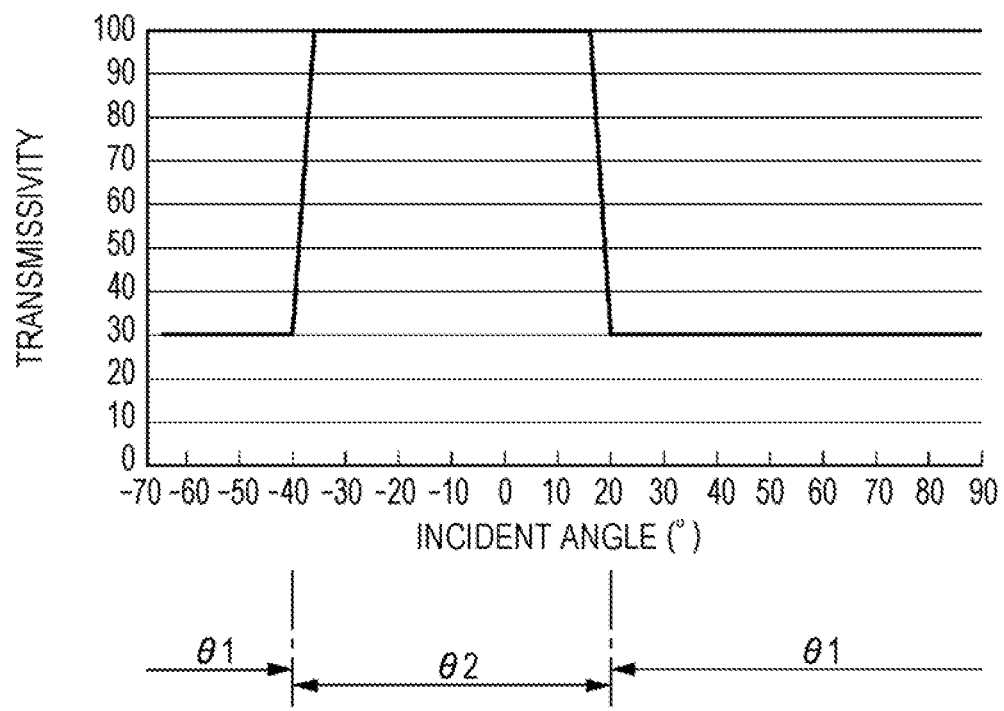

FIGS. 4A to 4B are views illustrating the optical system and the like of the display apparatus according to Embodiment 2 of the invention. FIG. 4A is a plan view, and FIG. 4B is a graph illustrating incident angle dependence of transmissivity of a multilayer film mirror used as an external light noise reduction element. In addition, since the basic configuration of the embodiment is similar to the configuration of Embodiment 1, the common portions are referenced by the same reference numerals and the descriptions thereof will not be repeated.

Even in the display apparatus 100 shown in FIG. 4B, similarly to in Embodiment 1, in the light guide member 20, the second diffractive optical element 17 is disposed so as to be overlapped with the image light incidence portion 21, and the first diffractive optical element 18 is disposed so as to be overlapped with the image light emission portion 23. In the embodiment, similarly to in Embodiment 1, the reflection coating is not applied on the first surface 20a and the second surface 20b of the light guide member 20. For this reason, in the light guide member 20, the entire surface except the image light incidence portion 21 and the image light emission portion 23 is the external light incidence portion 29 in which the external light can be incident.

In addition, in the display apparatus 100, similarly to in Embodiment 1, on the side opposite to the light guide member 20, the unnecessary external light (the external light L2 shown in FIG. 3) which is incident on the second surface 20b of the light guide member 20, for example, at the incident angle of +31°, is prevented from reaching the eye G of the observer by using the external light noise reduction element 19 that will be described hereinafter. Particularly, on the external light incidence portion 29 of the light guide member 20, the external light noise reduction element 19 is provided on the position where the unnecessary external light L2 is incident. In the embodiment, similarly to in Embodiment 1, the external light noise reduction element 19 is disposed along the second surface 20b of a side (opposite side to the surface side facing the image light emission portion 23 of the light guide member 20) opposite to the side where the first diffractive optical element 18 is disposed among the first surface 20a and the second surface 20b of the light guide member 20. Here, when the external light noise reduction element 19 is viewed from the normal line direction with respect to the image light emission portion 23, the external light noise reduction element 19 is overlapped with the first diffractive optical element 18. In addition, when the external light noise reduction element 19 is viewed from the normal line direction with respect to the image light emission portion 23, the external light noise reduction element 19 is disposed across a region which is greater than that of the first diffractive optical element 18. In addition, when the external light noise reduction element 19 is viewed from the direction along the virtual line (the positive first-order diffraction direction of the image light L0 by the first diffractive optical element 18 is the first direction) which passes through the eye G of the observer and the image light emission portion 23, the external light noise reduction element 19 is larger than the first diffractive optical element 18 and disposed across the region which is greater than that of the first diffractive optical element 18. Therefore, the virtual line (the positive first-order diffraction direction of the image light L0 by the first diffractive optical element 18 is the virtual line that extends along the first direction) which passes through the eye G of the observer and the image light emission portion 23 passes through the external light noise reduction element 19.

In the embodiment, the external light noise reduction element 19 is a multilayer film mirror 19b in which a plurality of dielectric films having different refractive indexes is laminated. In the embodiment, as shown in FIG. 4B, the multilayer film mirror 19b has a first incident angle range θ1 having approximately 30% transmissivity and a second incident angle range θ2 having higher transmissivity than that of the first incident angle range θ1. In the embodiment, the second incident angle range θ2 is, for example, an angle range from −40° to +20°, and the first incident angle range θ1 is an angle range from less than −40° to greater than +20°. Therefore, the first-order diffraction angle)(−25° of the image light L0 by the first diffractive optical element 18 is included in the second incident angle range θ2.

For this reason, as shown in FIG. 3, the external field light L1 which is incident at the angle range from −40° to +20°, including the external field light L1 which is incident at the incident angle of −25° on the second surface 20b of the light guide member 20 from the side opposite to the light guide member 20, reaches the eye G of the observer. In contrast, on the side opposite to the light guide member 20, the unnecessary external light L2 which is incident, for example, at the incident angle of +31°, on the second surface 20b of the light guide member 20 is reflected by the multilayer film mirror 19b. Accordingly, since the unnecessary external light L2 is not incident on the light guide member 20, it is possible to inhibit the unnecessary external light L2 from reaching the eye G of the observer.

In addition, in the embodiment, the external light noise reduction element 19 is the multilayer film mirror 19b. As shown in FIG. 4B, the external light noise reduction element 19 has high transmissivity at the incident angle range (the second incident angle range θ2) from −40° to +20°. For this reason, it is possible to see the external field light L1 of the background which is incident on the second surface 20b of the light guide member 20 from the side opposite to the light guide member 20, at a wide angle range. For this reason, it is advantageous that the angle range where the see-through manner is possible is wide.

Embodiment 3

Figure 5:
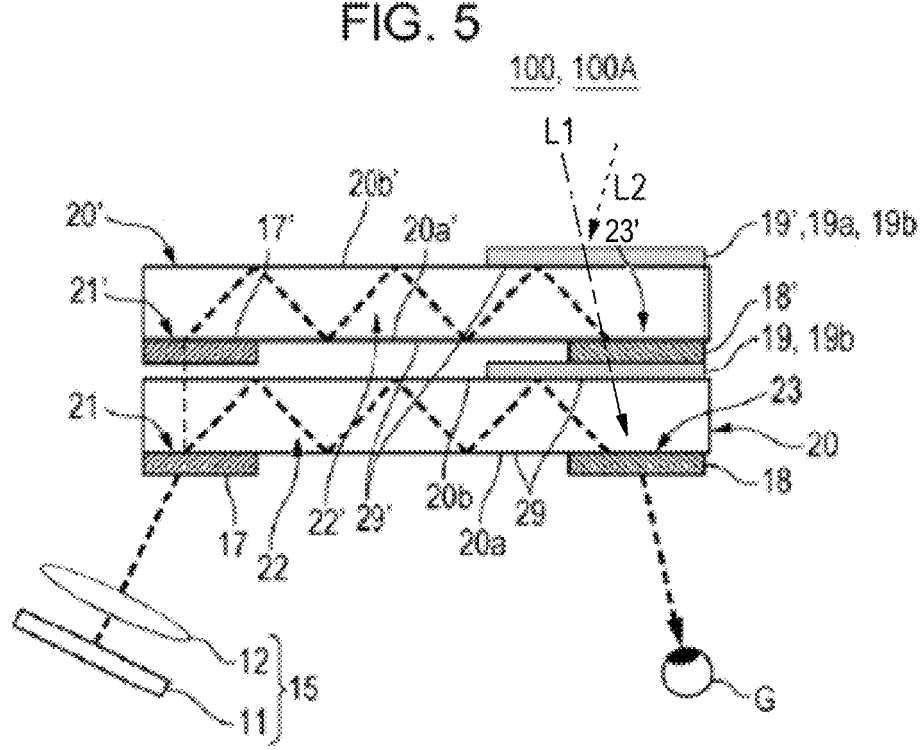
FIG. 5 is a view illustrating the optical system and the like of the display apparatus according to Embodiment 3 of the invention.

FIG. 5 is a view illustrating the optical system and the like of the display apparatus according to Embodiment 3 of the invention. In addition, since the basic configuration of the embodiment is similar to the configuration of Embodiment 1, the common portions are referenced by the same reference numerals and the descriptions thereof will not be repeated.

Even in the display apparatus 100 shown in FIG. 5, similarly to in Embodiment 1, in the light guide member 20, the second diffractive optical element 17 is disposed so as to be overlapped with the image light incidence portion 21, and the first diffractive optical element 18 is disposed so as to be overlapped with the image light emission portion 23. In addition, the reflection coating is not applied on the first surface 20a and the second surface 20b of the light guide member 20. For this reason, in the light guide member 20, the entire surface except the image light incidence portion 21 and the image light emission portion 23 is the external light incidence portion 29 in which the external light can be incident. Even in the display apparatus 100, similarly to in Embodiment 1, on the external light incidence portion 29 of the light guide member 20, the external light noise reduction element 19 which has the multilayer film mirror 19b is provided on the position where the unnecessary external light L2 is incident. In the embodiment, similarly to in Embodiment 1, the external light noise reduction element 19 is disposed so as to be overlapped with the second surface 20b of the side (opposite side to the surface side facing the image light emission portion 23 of the light guide member 20) opposite to the side where the first diffractive optical element 18 is disposed among the first surface 20a and the second surface 20b of the light guide member 20. In addition, when the external light noise reduction element 19 is viewed from the normal line direction with respect to the image light emission portion 23, the external light noise reduction element 19 is overlapped with the first diffractive optical element 18. When the external light noise reduction element 19 is viewed from the normal line direction with respect to the image light emission portion 23, the external light noise reduction element 19 is disposed across the region which is greater than that of the first diffractive optical element 18.

Here, the light guide member 20 is disposed as a first light guide member that guides the positive first-order diffracted light of the image light L0 diffracted by the second diffractive optical element 17 to the image light emission portion 23. In the embodiment, on the side opposite to the image light emission device 15 with respect to the above-described light guide member 20, a light guide member 20' (a second light guide member) that guides the zero-order light of the second diffractive optical element 17 to the image light emission portion 23 is disposed. The light guide member 20' is disposed so as to face the light guide member 20.

Similarly to the light guide member 20, the above-described light guide member 20' is also an integrated component, but functionally, can be considered as a component separated into an image light incidence portion 21', a light guide portion 22', and an image light emission portion 23'.

The image light incidence portion 21' is a surface that faces the one side end portion of the X direction of the light guide member 20. The image light emission portion 23' is a surface that faces the other side end portion of the X direction of the light guide member 20. The light guide portion 22' is a part positioned between the image light incidence portion 21' and the image light emission portion 23'.

In addition, similarly to the light guide member 20, in the light guide member 20', a second diffractive optical element 17' is disposed so as to be overlapped with the image light incidence portion 21', and a first diffractive optical element 18' is disposed so as to be overlapped with the image light emission portion 23'. For this reason, the first diffractive optical element 18' is overlapped with the external light noise reduction element 19 provided in the light guide member 20. In addition, the reflection coating is not applied on a first surface 20a' and a second surface 20b' of the light guide member 20'. For this reason, in the light guide member 20', the entire surface except the image light incidence portion 21' and the image light emission portion 23' is an external light incidence portion 29' in which the external light can be incident.

In addition, in the light guide member 20', the external light noise reduction element 19' is provided which is composed of the polarizing member 19a, the multilayer film mirror 19b and the like. The external light noise reduction element 19' is disposed to be overlapped with the second surface 20b' of the side (opposite side to the surface side facing the image light emission portion 23' of the light guide member 20') opposite to the side where the first diffractive optical element 18' is disposed among the first surface 20a' and the second surface 20b' of the light guide member 20'. Here, when the external light noise reduction element 19' is viewed from the normal line direction with respect to the image light emission portion 23', the external light noise reduction element 19' is overlapped with the first diffractive optical element 18'. In addition, when the external light noise reduction element 19' is viewed from the normal line direction with respect to the image light emission portion 23', the external light noise reduction element 19' is disposed across a region which is greater than that of the first diffractive optical element 18'.

In the display apparatus 100 with such a configuration, if the image light L0 is emitted from the image light emission device 15, the positive first-order diffracted light diffracted in the X direction by the second diffractive optical element 17 is incident on the light guide member 20 from the image light incidence portion 21. As described in Embodiment 1, the above-described positive first-order diffracted light goes through the image light emission portion 23 and the first diffractive optical element 18 and heads toward the eye G of the observer, after moving forward in the light guide member 20.

In the embodiment, the zero-order light of the second diffractive optical element 17 is also incident on the light guide member 20 from the image light incidence portion 21. However, the zero-order light has a small incident angle with respect to the second surface 20b of the light guide member 20. Therefore, the zero-order light is emitted from the second surface 20b of the light guide member 20 toward the second diffractive optical element 17'. The zero-order light emitted from the second surface 20b of the light guide member 20 is diffracted in the X direction by the second diffractive optical element 17' and incident on the light guide member 20' from the image light incidence portion 21'.

Then, in the light guide member 20', first of all, the image light L0 is incident on the second surface 20b' of the light guide member 20' and entirely reflected. Next, the image light L0 is incident on the first surface 20a' of the light guide member 20' and entirely reflected. By repeating this operation, the image light is guided to the side where the image light emission portion 23' is positioned in an inner portion of the light guide member 20'.

The image light L0 is transmitted through the external light noise reduction element 19 provided in the light guide member 20 and is incident on the light guide member 20, after being emitted from the image light emission portion 23' and diffracted in the X direction by the first diffractive optical element 18'. After that, the image light L0 reaches the eye G of the observer via the image light emission portion 23 and the first diffractive optical element 18.

Even in the display apparatus 100 with such a configuration, similarly to in Embodiments 1 and 2, the observer can see the image formed by the image light emission device 15, the background on the side opposite to the light guide member 20, and the like, in a see-through state. Meanwhile, for example, on the side opposite to the light guide member 20, it is possible to inhibit the unnecessary external light L2 which is incident, for example, at the incident angle of +31°, on the second surface 20b of the light guide member 20 from reaching the eye G of the observer.

In addition, in the embodiment, both of the external light noise reduction element 19 and external light noise reduction element 19' are used, but it is possible to alleviate the unnecessary external light L2 that reaches the eye G of the observer only by using one of the external light noise reduction elements.

What is claimed is:

1. A display apparatus comprising:
   an image forming device which emits an image light;
   a first light guide member which has a first light incidence portion and a first light emission portion;
   a first diffractive optical element provided in the first light emission portion;
   a second light guide member which has a second light incidence portion and a second light emission portion, the second light guide member provided over the first light guide member;
   a second diffractive optical element provided in the second light emission portion; and
   a first external light noise reduction element provided over the second light guide member,
   wherein
   the first external light noise reduction element is overlapped with the first light emission portion and the second light emission portion,
   the first light incidence portion is overlapped with the second light incidence portion,
   the image light is incident on the first light incidence portion, a part of the image light is guided in the first light guide member, and another part of the image light is incident on the second light incidence portion and is guided in the second light guide member,
   external light passes through the first external light noise reduction element, the second light emission portion, and the first light emission portion,
   the external light includes a first polarized light and a second polarized light, of which a polarization direction is different from the first polarized light, and
   a diffraction efficiency of the first polarized light in the first diffractive optical element is lower than a diffraction efficiency of the second polarized light in the first diffractive optical element, and the diffraction efficiency of the second polarized light gradually decreases as an incident angle of the second polarized light on the first diffractive optical element increases.

2. The display apparatus according to claim 1, wherein
   the first external light noise reduction element is configured to comprise a first transmissivity for a first incident angle range, a second transmissivity which is higher than the first transmissivity for a second incident angle range which is less acute than the first incident angle range, and the first transmissivity for a third incident angle range which is more acute than the second incident angle range.

3. The display apparatus according to claim 2, wherein a diffraction efficiency of the first polarized light in the second diffractive optical element is lower than a diffraction efficiency of the second polarized light in the second diffractive optical element.

4. The display apparatus according to claim 2, wherein
   the part of the image light includes a third polarized light and a fourth polarized light, the fourth polarized light has a polarization direction that is the same as the second polarized light, and the part of the image light is diffracted by the first diffractive optical element, and
   a diffraction efficiency of the third polarized light in the first diffractive optical element is lower than a diffraction efficiency of the fourth polarized light in the first diffractive optical element.

5. The display apparatus according to claim 4, wherein
   the another part of the image light includes a fifth polarized light and a sixth polarized light, the sixth polarized light has a polarization direction that is the same as the second polarized light, and the another part of the image light is diffracted by the second diffractive optical element, and
   a diffraction efficiency of the fifth polarized light in the second diffractive optical element is lower than a diffraction efficiency of the sixth polarized light in the second diffractive optical element.

6. The display apparatus according to claim 1, wherein the first external light noise reduction element is a polarizing member.

7. The display apparatus according to claim 1, further comprising:
   a second external light noise reduction element which comprises a first side connected to a first light guide member and a second side connected to the third diffractive optical element which is connected to the second light guide member.

* * * * *